United States Patent
Yohanan et al.

(10) Patent No.: US 12,519,413 B2
(45) Date of Patent: Jan. 6, 2026

(54) WELLBORE DEVICE FUNCTION CONFIRMATION

(71) Applicant: Halliburton Energy Services, Inc., Houston, TX (US)

(72) Inventors: Tom Yohanan, Sand Springs, OK (US); Noel Johney, Bixby, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 150 days.

(21) Appl. No.: 18/297,236

(22) Filed: Apr. 7, 2023

(65) Prior Publication Data
US 2024/0339949 A1    Oct. 10, 2024

(51) Int. Cl.
*H02P 29/024* (2016.01)
*E21B 43/12* (2006.01)

(52) U.S. Cl.
CPC .......... *H02P 29/024* (2013.01); *E21B 43/128* (2013.01)

(58) Field of Classification Search
CPC .............................. H02P 29/024; E21B 43/128
USPC .......................................................... 318/490
See application file for complete search history.

(56) References Cited

U.S. PATENT DOCUMENTS

| | | | | |
|---|---|---|---|---|
| 6,056,384 | A * | 5/2000 | Sato | H02P 7/04 318/400.29 |
| 9,654,048 | B2 * | 5/2017 | West | H02P 1/022 |
| 2006/0109034 | A1 * | 5/2006 | Okitsu | H03K 17/687 327/108 |
| 2009/0218963 | A1 * | 9/2009 | Shen | F04B 47/00 318/135 |
| 2016/0025802 | A1 * | 1/2016 | Sicard | G01R 31/2608 324/762.08 |
| 2017/0159656 | A1 * | 6/2017 | Tientcheu-Yamdeu | F04D 13/08 |

FOREIGN PATENT DOCUMENTS

CN            107807319 B        3/2020

OTHER PUBLICATIONS

International Search Report and Written Opinion, Dec. 28, 2023, 10 pages.

* cited by examiner

*Primary Examiner* — Jorge L Carrasquillo
(74) *Attorney, Agent, or Firm* — Kilpatrick Townsend & Stockton LLP

(57) ABSTRACT

Processing device-based systems and methods of testing IGBTs of a variable frequency drive inverter for proper functioning. The variable frequency drive may be used to control a motor, or another load associated with a hydrocarbon wellbore operation. During testing, a conductivity test can be performed on the IGBTs of the inverter, and if the conductivity test is passed, a quality check can be subsequently performed. The quality check can determine that one or more IGBTs of the inverter are not functioning properly when a discharge profile generated as part of the quality check differs from a stored reference discharge profile. The ability to assure that the IGBTs of a variable frequency drive are functioning properly can prevent potentially serious problems related to IGBT failure.

20 Claims, 7 Drawing Sheets

| Switch (IGBT) positions | | | | | | Output voltage | | |
|---|---|---|---|---|---|---|---|---|
| 224 | 226 | 228 | 230 | 232 | 234 | Vab | Vbc | Vca |
| ON | OFF | OFF | ON | ON | OFF | VDC | -VDC | 0 |
| OFF | ON | ON | OFF | ON | OFF | -VDC | 0 | VDC |
| ON | OFF | ON | OFF | OFF | ON | 0 | VDC | -VDC |

WELLBORE DEVICE FUNCTION CONFIRMATION

TECHNICAL FIELD

The present disclosure relates generally to components for hydrocarbon well operations and, more particularly (although not necessarily exclusively), to electrical circuitry for selectively controlling the power to a device for performing a wellbore operation.

BACKGROUND

Hydrocarbon well operators may use motors for various functions, such as for example, to drive pumps or compressors of artificial lift systems, to operate equipment during field development or wellbore cementing operations, or to actuate control valves. Motors used in such capacities can be operated at different speeds. Variable speed drives, such as variable frequency drives, can be used to control the speed of motors, including motors used in wellbore operations.

Variable frequency drives typically include an inverter as a part of the drive topology. The inverter includes switching elements. The switching elements of modern variable frequency drives can be transistor-based devices, for example, insulated gate bipolar transistors (IGBTs). IGBTs can become damaged in several ways, which can negatively affect variable frequency drive performance or prevent variable frequency drive operation. Therefore, assuring that the IGBTs of a variable frequency drive are functioning properly before utilizing the drive with respect to wellbore operations can prevent potential problems.

DETAILED DESCRIPTION

Figure 1:
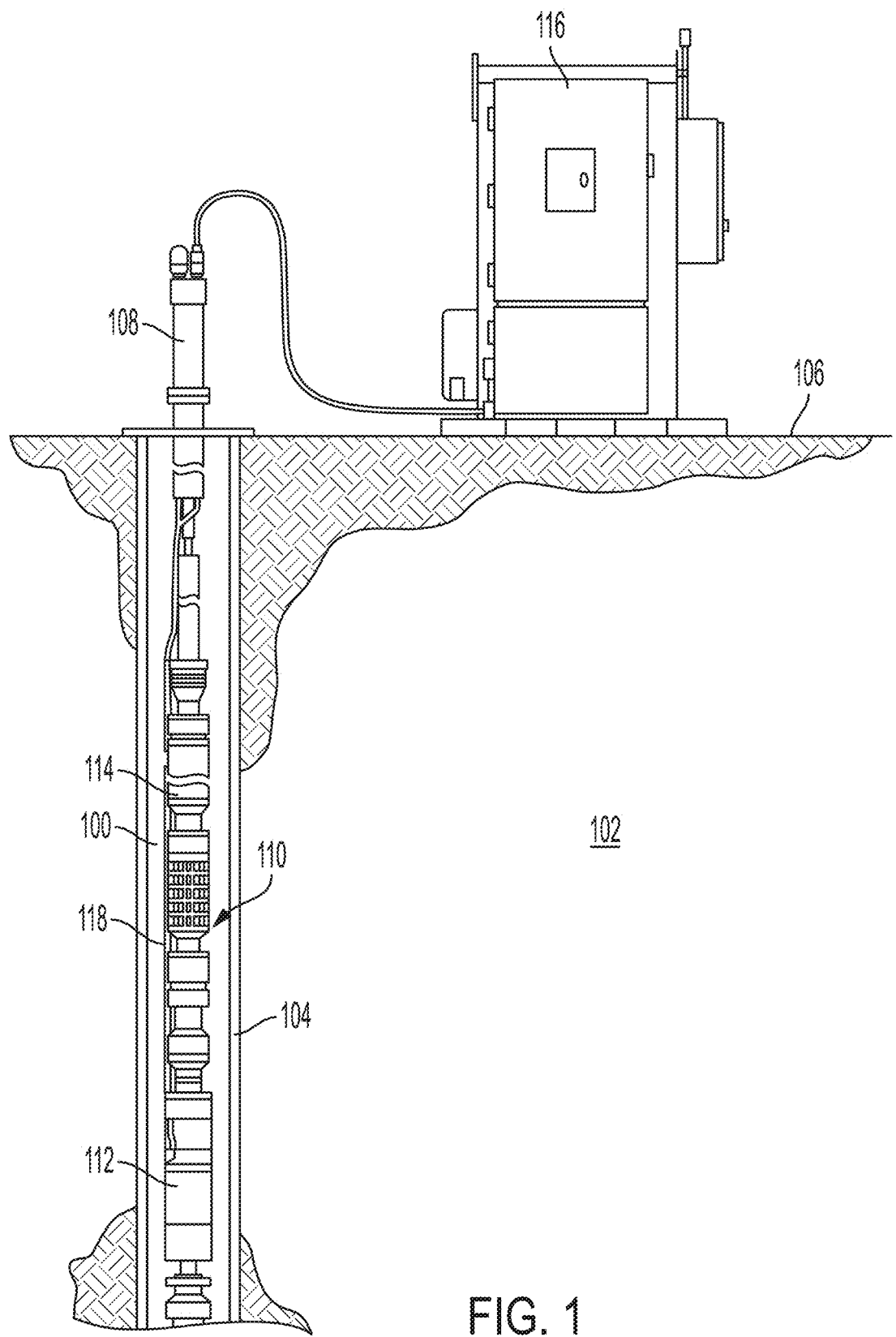
FIG. 1 is a schematic diagram of a variable speed motor-driven artificial lift device operating on a hydrocarbon wellbore according to one example of the present disclosure.

Certain aspects and examples of the present disclosure relate to wellbore device function confirmation and, more specifically, to confirming the proper functioning of insulated gate bipolar transistors (IGBTs) of an inverter of a variable speed drive that can be used in wellbore operations. IGBTs may be the weakest link in a variable speed drive. Different factors, including but not necessarily limited to, excessive temperature, excessive current, or excessive voltage, can damage an IGBT, and a partially damaged IGBT can be difficult to detect. This is problematic, because a damaged IGBT can catastrophically fail inside a variable frequency drive, which may result in fire, explosion, and possible damage to nearby equipment or persons associated with a wellbore operation. Accordingly, examples of the present disclosure can identify improperly functioning or non-functioning IGBTs within variable frequency drives to prevent drive failure and associated damage or harm.

Proper functioning, as used herein, refers to the ability of an IGBT to conduct electrical energy as expected (e.g., that the IGBT is not shorted or open), and to the ability of an IGBT to function in accordance with its designed operating parameters, such as to function at full capacity rather than a degraded capacity. In addition to identifying improperly functioning or non-functioning IGBTs, some examples according to the present disclosure can be used to identify IGBTs with a reduced life, such as may occur through use or exposure to adverse operating conditions. A variable frequency drive that employs an IGBT identified as having a reduced life can then be monitored or scheduled for replacement prior to an estimated time to IGBT failure.

Some examples according to the present disclosure may evaluate the IGBTs of a variable frequency drive inverter for proper functioning before the variable frequency drive is commissioned for use. Other examples according to the present disclosure may evaluate the IGBTs of a variable frequency drive inverter for proper functioning after the variable frequency drive has been placed into use at a site of a wellbore operation, such as during maintenance, etc. Examples according to the present disclosure can also be designed to operate online or offline, and without the need to remove IGBTs from a variable frequency drive within which the IGBTs are incorporated in order to perform an assurance evaluation.

Examples according to the present disclosure may employ a computing device having a processing device and memory including instructions that are executable by the processing device to cause the processing device to determine if the IGBTs of a variable frequency drive inverter are functioning properly. The processing device can be communicatively coupled to the IGBTs of the variable frequency drive inverter in order to evaluate the IGBTs for proper functioning. In some examples, the processing device and memory may be resident on a motor control board or a similar component of a given variable frequency drive, and the instructions to cause the processing device to determine if the IGBTs of the variable frequency drive inverter are functioning properly can be written to the memory of the motor control board or the similar component. The motor control board or the similar component can be accessed via, for example, a human-machine interface associated with motor control board or the similar component and in communication with the processing device thereof.

According to some examples of the present disclosure, a conductivity test may be initially performed on the IGBTs of the variable frequency drive inverter. The conductivity test can determine that the IGBTs conduct electrical current as expected, as opposed to being shorted or open. Performing the conductivity test can also identify completely failed IGBTs, and can avoid failures of a subsequently performed quality check.

If the IGBTs of the variable frequency drive inverter pass the conductivity test, a quality check of the IGBTs can be performed. According to some quality check examples of the present disclosure, the various IGBTs of the inverter can be turned on and off in a manner that creates an overlapping tail current, and the tail current can thereafter be used to discharge a capacitor of a DC bus of the variable frequency drive circuitry.

A difference in capacitor discharge profiles can be used to detect an improperly functioning IGBT. More particularly, an improperly functioning IGBT of the inverter may be detected by comparing a discharge profile associated with IGBTs subjected to the quality check with a stored reference discharge profile. A difference in the compared discharge profiles can indicate an improperly functioning IGBT. A determination that one or more IGBTs of a variable frequency drive inverter are not functioning properly can result in a warning or another type of notification regarding use of the variable frequency drive.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 schematically depicts a hydrocarbon wellbore 100 according to one example of the present disclosure. The wellbore 100 can be formed, for example, in a subterranean formation 102. The wellbore 100 can be a first wellbore in a set of wellbores of a multi-well pad or other suitable structure or system. The wellbore 100 can include a casing 104 or other suitable component (e.g., a tubing string, etc.) that can transport produced fluid from the wellbore 100 to the surface 106. The outflow of fluid from the wellbore 100 may be transferred to a downstream location via a flow line or a similar conduit.

In this example, an artificial lift device in the form of an electric submersible pump (ESP) 110 is located within the wellbore 100 and operates to assist with movement of wellbore fluid from a downhole location in the wellbore 100 to the surface 106 through a wellhead 108. Artificial lift devices such as the ESP 110 may be used, for example, to help maintain a fluid flow from a wellbore in which subterranean pressures have decreased over time. The ESP 110 includes, at a location within the wellbore 100, an electric motor 112 that is coupled to and drives a pump 114. Operation of the pump 114 by the electric motor 112 causes the pump to draw in wellbore fluid and to transport the wellbore fluid to the surface 106 through the wellhead 108.

The electric motor 112 can be controlled by a variable speed drive, such as a variable frequency drive 116, that may be located on the surface 106 and can be electrically coupled to the electric motor 112, such as by a cable 118. In some examples, the cable 118 may provide both power and control signals to the electric motor 112. The variable frequency drive 116 in this example includes an inverter having a plurality of switching elements in the form of insulated gate bipolar transistors (IGBTs). The variable frequency drive 116 allows the electric motor 112, and consequently the pump 114, to be selectively operated at different speeds.

Although the variable frequency drive 116 is used to control the electric motor 112 of an artificial lift device in the form of an ESP 110 in the example of FIG. 1, variable frequency drives may also be used to control electric motors of other artificial lift devices used in hydrocarbon well operations. For example, a variable frequency drive may be used to control an electric motor associated with an artificial lift device such as, without limitation, a rod lift (pumpjack) device, a plunger lift device, a progressive cavity pump device, or the compressor of a gas lift device. Variable frequency drives may also be used to control electric motors and other loads associated with hydrocarbon well operations, such as for example, electric motors used during field development or during wellbore cementing operations, for driving other types of pumps such as pumps for maintaining downstream flow line fluid pressure, or to operate various types of control valves.

Figure 2:
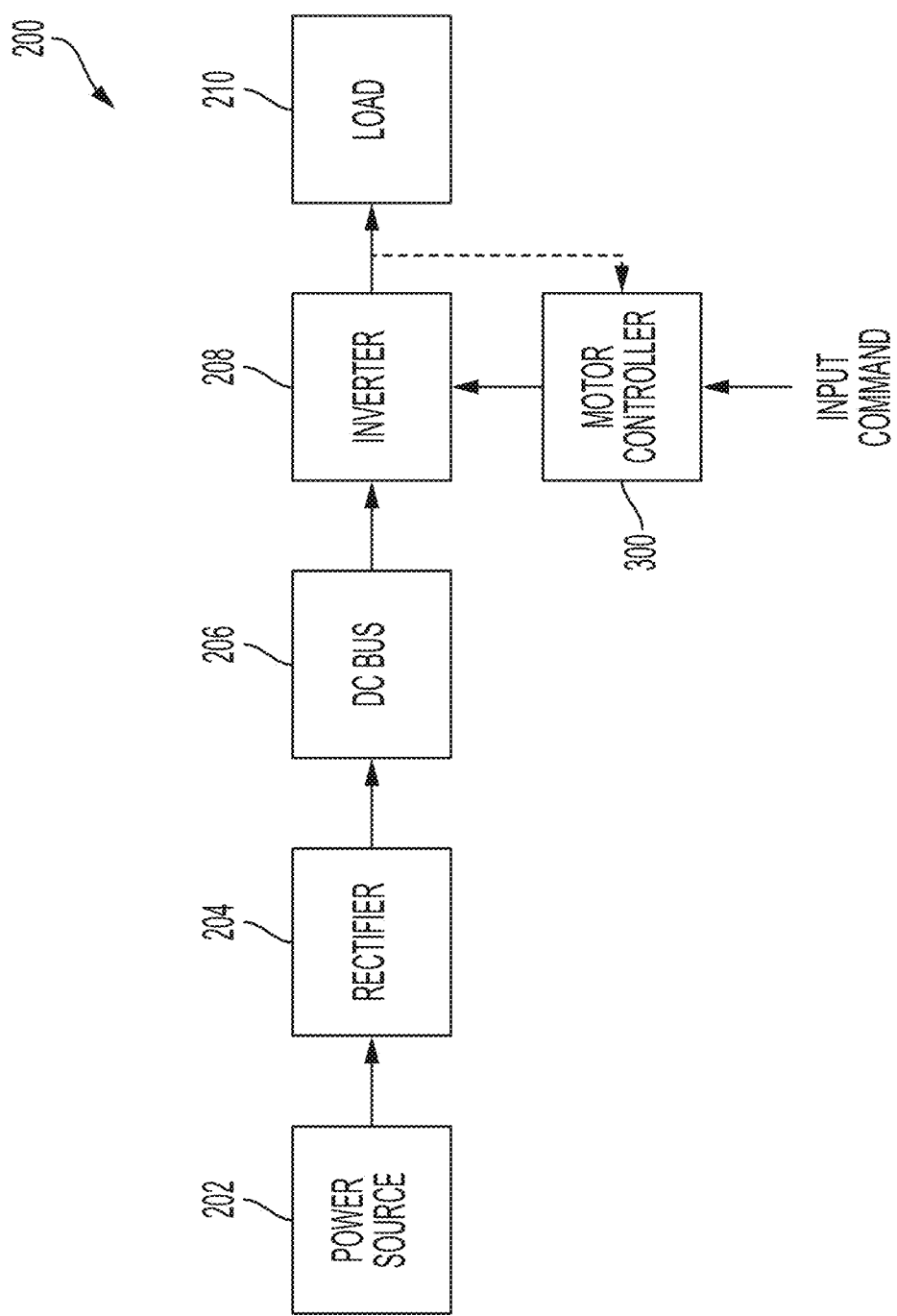
FIG. 2 is a functional block diagram of a variable frequency drive according to one example of the present disclosure.

FIG. 2 is a functional block diagram of one example of a circuit 200 of a three-phase variable frequency drive, which may be subjected to examples of the present disclosure. As represented in FIG. 2, electrical energy from an alternating current (AC) electrical power source 202 is provided to a rectifier 204 of the variable frequency drive circuit 200, which converts the AC electrical energy into direct current (DC) electrical energy that is thereafter provided through a DC bus 206 to an inverter 208 of the variable frequency drive circuit 200. As would be understood by one of skill in the art, the inverter 208 includes a plurality of switches that are operable to selectively supply electrical energy to a load 210 (e.g., an electric motor in this example) with varied timing. This allows the variable frequency drive circuit 200 to operate the electric motor 210 at different speeds.

A motor controller 300 is shown in FIG. 2 to be communicatively coupled to the inverter 208 of the variable frequency drive circuit 200. The motor controller 300 may be used to provide speed control signals or other control signals to the inverter 208 of the variable frequency drive circuit 200, and may also accept related input commands from a user. As indicated, the motor controller 300 may receive feedback regarding the speed or other operational parameters of the electric motor 210.

Figure 3:
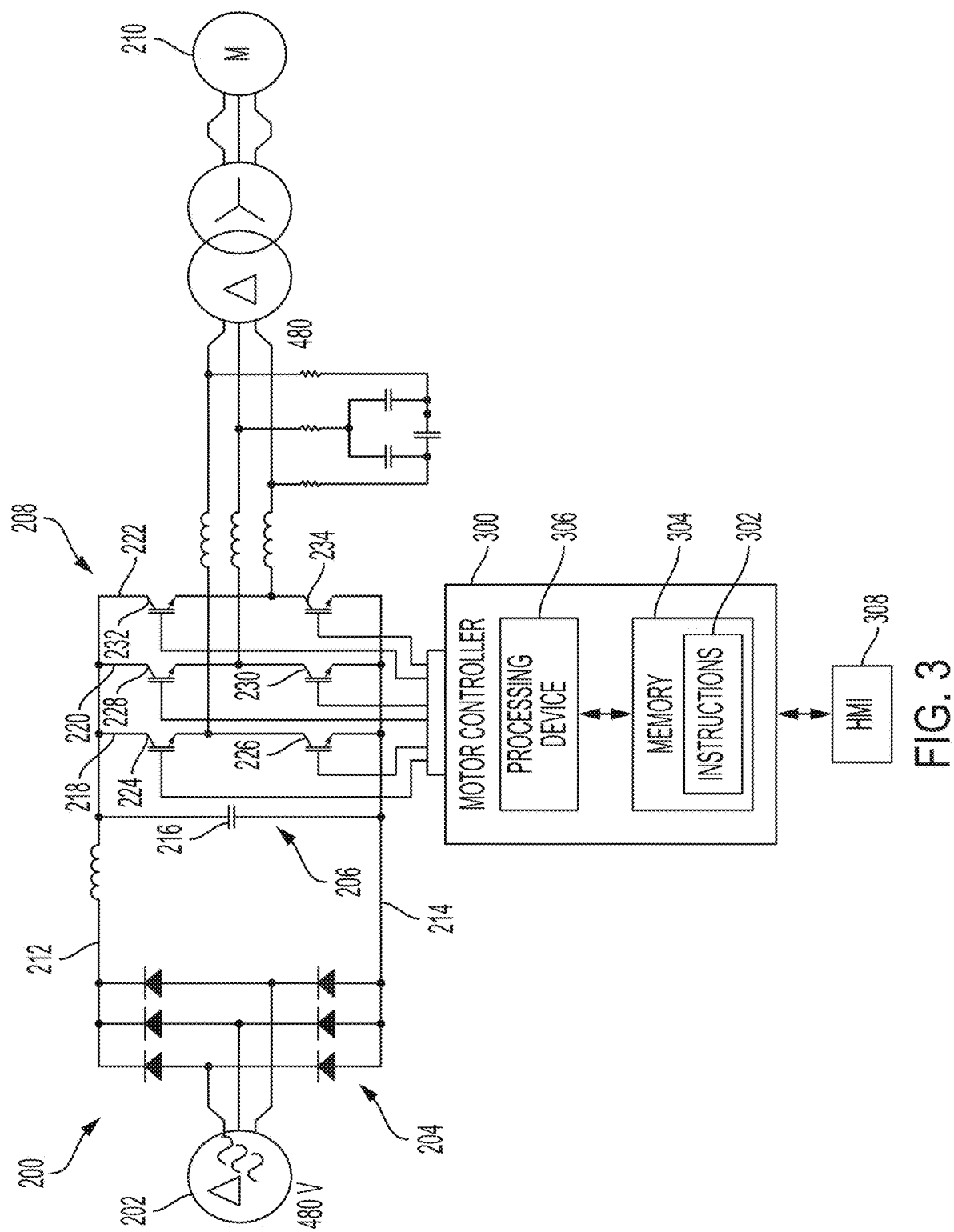
FIG. 3 is a schematic electrical circuit diagram of a variable frequency drive according to one example of the present disclosure.

FIG. 3 is a schematic electrical diagram of the variable frequency drive circuit 200 represented by the functional block diagram of FIG. 2. It should be understood that the variable frequency drive circuit 200 of FIG. 3 is provided only for purposes of illustration, and nothing herein is to be interpreted as limiting examples of the present disclosure to use with a three-phase inverter or the particular variable frequency drive circuit topology depicted in FIG. 3. Further, there may be other components of the variable frequency drive circuit 200 that are not shown in FIG. 3, whether for reasons of irrelevancy, clarity, or otherwise.

As indicated in FIG. 3, the AC electrical energy source 202 represented in FIG. 2 may be, for example, a 480 volt three-phase AC electrical energy source and the electric motor 210 may be a three-phase electric motor that may be operated at various speeds via the circuit 200 of the variable frequency drive. As may be observed, the rectifier 204 includes a plurality of diode pairs, and the DC bus 206 precedes the inverter 208 and is connected between a positive DC rail 212 and a negative DC rail 214 of the inverter of the variable frequency drive circuit 200. The DC bus also includes a DC bus capacitor 216.

In this example, the three-phase inverter 208 has three phase legs 218, 220, 222, with each phase leg including a pair of IGBTs. Particularly, the first phase leg 218 includes a first IGBT 224 and a second IGBT 226, the second phase leg 220 includes a first IGBT 228 and a second IGBT 230, and the third phase 222 includes a first IGBT 232 and a second IGBT 234. As used herein relative to the phase legs 218, 220, 222 of the inverter 208, or the IGBTs 224-234, the terms first, second, and third are intended only for distinguishment of the elements and not to indicate a hierarchy, a specific location, or for any other purpose. One of skill in the art will also recognize that the IGBTs referred to herein as first and second IGBTs, may also be commonly referred to in the art as top and bottom IGBTs, or by other similar terminology.

While the inverter topology presented in FIG. 3 is provided for purposes of illustration, it should be understood that examples of the present disclosure may be used with various inverter topologies. For example, in addition to the variable frequency drive inverter topology of FIG. 3, examples of the present disclosure may be used to evaluate the IGBTs of inverters having IGBTs in at least two individual legs, such as single-phase inverters, and other multi-phase inverters having multiple individual phase legs where less than all of the individual phase legs include IGBTs (e.g., a three-phase, four-IGBT inverter).

Referring still to FIG. 3, it may be further observed that the motor controller 300, which may be a motor control board, can be electrically coupled to each of the plurality of IGBTs 224-234 of the inverter 208. According to some examples of the present disclosure, computer-readable instructions 302 may be stored in a memory 304 of the motor controller 300 and are executable by a processing device 306 of the motor controller 300 to cause the processing device 306 to test a function of one or more of the plurality of IGBTs 224-234 to confirm proper functioning of the one or more of the plurality of IGBTs.

A human-machine interface (HMI) 308 may be communicatively coupled with the motor controller 300. The HMI 308 can provide user access to the motor controller 300 for purposes such as but not limited to, storing the computer-readable instructions 302 in the memory 304 of the motor controller 300, and for inputting commands that cause the processing device 306 to perform the operations written in the computer-readable instructions 302. As such, a user may initiate the process of evaluating the IGBTs 224-234 of the inverter 208 for proper functioning through the HMI 308.

The primary topology of the motor controller 300 may be inherent to the design of the variable frequency drive of which it is a part, or the motor controller 300 may have a custom topology, or a topology otherwise dictated by or affected by a user. In any case, according to some examples of the present disclosure, the processing device 306 of the motor controller 300 can include one processing device or multiple processing devices. Non-limiting examples of the processing device 306 include a Field-Programmable Gate Array (FPGA), an application-specific integrated circuit (ASIC), a microprocessor, etc. The processing device 306 can execute the computer-readable instructions stored in the memory 304 to perform the operations described herein. In some examples, the instructions can include processor-specific instructions generated by a compiler or an interpreter from code written in a suitable computer-programming language, such as C, C++, C #, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can be a non-transitory computer-readable medium from which the processing device 306 can read the instructions. Non-limiting examples of a computer-readable medium include memory chip(s), ROM, random-access memory (RAM), an ASIC, a configured processor, or any other medium compatible with the construction of the motor controller 300 and from which the processing device 306 can read the instructions.

As represented in the example of FIG. 3, because the processing device 306, memory 304, and computer-readable instructions 302 are located in the motor controller 300 that is communicatively coupled to the variable frequency drive circuit 200, the operations associated with assuring proper functioning of the inverter IGBTs 224-234 according to some examples of the present disclosure, may be initiated and accomplished without the need to remove the IGBTs 224-234 from the variable frequency drive. Thus, examples according to the present disclosure afford a significant improvement in efficiency over the alternative method of removing IGBTs from a variable frequency drive before testing.

Figures 4, 5:
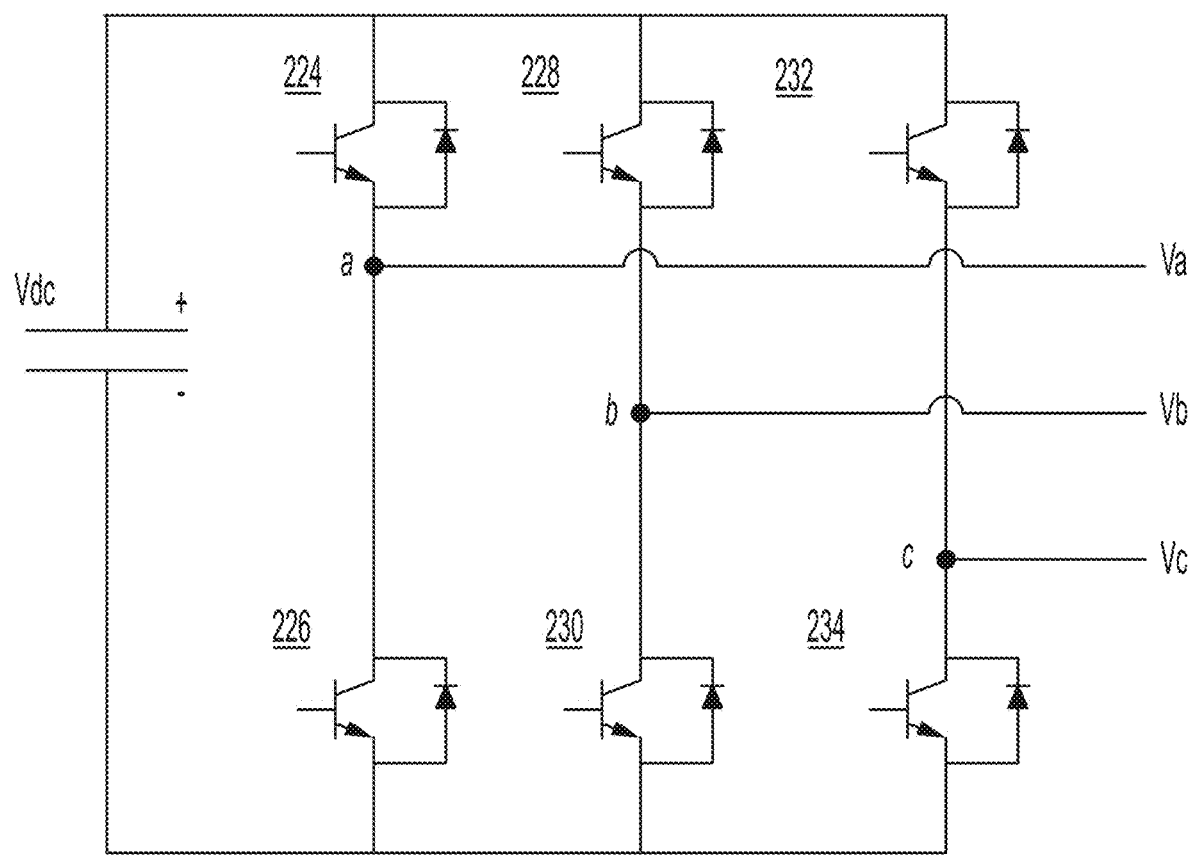
FIG. 4 is an enlarged view of an inverter portion of the variable frequency drive circuit shown in FIG. 3.
FIG. 5 is a table indicating possible states of various IGBTs of the inverter of FIG. 4 during an IGBT conductivity test according to an aspect of the present disclosure.

FIG. 4 is an enlarged view of the inverter 208 of the variable frequency drive circuit 200 shown in FIG. 3. In FIG. 4, the first, second and third individual phase legs identified in FIG. 3 with reference numbers 218, 220, 222, are respectively identified as phase leg a, phase leg b, and phase leg c for purposes of further explanation and illustration. Consequently, phase leg a of the inverter 208 can be observed to include the pair of IGBTs 224 and 226, while phase leg b of the inverter 208 includes the pair of IGBTs 228 and 230, and phase leg c of the inverter 208 includes the pair of IGBTs 232 and 234. It may also be observed in FIG. 4, that phase leg a carries a first phase Va of the three-phase voltage provided to the inverter 208, phase leg b carries a second phase Vb, and phase leg c carries a third phase Vc. As would be understood by one of skill in the art, turning on and turning off the IGBTs 224-234 of the various phase legs a, b, c (i.e., 218, 220, 222) in particular orders with particular timings can result in the delivery of pulse width modulated electric power to the electric motor 210 coupled to the variable frequency drive circuit 200. The speed of the electric motor 210 can be effectively and efficiently controlled in this manner.

FIG. 5 is a table indicating different states of the IGBTs 224-234 of the inverter 208 represented in FIG. 4 during one example of an IGBT conductivity test performed according to some examples of the present disclosure. Consideration of FIG. 5 in cooperation with the inverter diagram of FIG. 4, affords a better understanding of the conductivity test.

In one example according to the present disclosure, a conductivity test aspect of evaluating the IGBTs of a three-phase inverter for proper functioning involves, with the DC bus capacitor 216 charged, simultaneously turning on, in various preselected combinations, one of the IGBTs of the pair of IGBTs in each phase leg of the inverter, such as by causing the processing device 306 to apply a gate signal. The load is preferably disconnected during the conductivity test.

In the case of the example represented in part by the table of FIG. 5, it can be observed that in a first stage of the conductivity test, the IGBTs 224 of the first phase leg a, 230 of the second phase leg b, and 232 of the third phase leg c, are turned on by the processing device 306, while the other IGBTs remain off. In a second stage of the conductivity test, the IGBTs 226 of the first phase leg a, 228 of the second phase leg b, and 232 of the third phase leg c, are turned on by the processing device 306, while the other IGBTs remain off. In a third stage of the conductivity test, the IGBTs 224 of the first phase leg a, 228 of the second phase leg b, and 234 of the third phase leg c, are turned on by the processing device 306, while the other IGBTs remain off. Examples of the present disclosure are not limited to the specific ordering of the testing stages nor the particular combinations of the IGBTs that are turned on or turned off as indicated in FIG. 5.

The selected IGBT states of the three stages of this conductivity test example result in the respective first, second, and third stage processing device-measured output voltages Vab, Vbc, and Vca shown in the table of FIG. 5. In this case, each of the measured voltages is as expected based on the associated combination of IGBT states. This output of expected measured voltages indicates that each of the IGBTs 224-234 of the inverter 208 is properly conducting electrical energy, which likewise indicates that none of the IGBTs have failed. Consequently, it can be determined by the processing device that each IGBT 224-234 of the inverter 208 passes the conductivity test in this example.

Contrarily, a failure of one or more IGBTs of the variable frequency drive inverter 208 to pass the conductivity test according to examples of the present disclosure, can be indicated by a resulting unexpected voltage measurement across the applicable phase legs of the inverter 208. For example, a Vab voltage measurement of 0 volts during the first stage of the conductivity test instead of the positive DC voltage measurement indicated in the table of FIG. 5 indicates a failure of IGBT 224 or IGBT 230. Other unexpected voltage measurements, such as voltage measurements having a polarity opposite of an expected polarity, can also indicate a failed IGBT, such as an IGBT that is shorted or open. A failed IGBT can present a possible hazard to operation of the variable frequency drive, and can also result in a failure of the IGBTs of the inverter 208 to pass a subsequent quality check portion of method examples according to present disclosure. Consequently, according to aspects of the present disclosure, detection of a failed IGBT during a conductivity check can result in generation of a notification or other warning, and can also prohibit a subsequent quality check of the IGBTs.

Passing of the conductivity test by the IGBTs 224-234 of the inverter 208 allows the IGBTs to be subsequently subjected to a quality check. Before performing the quality check, the DC bus capacitor 216 is recharged via the rectifier 204 to return the DC bus capacitor to a state of voltage charge. The DC bus capacitor 216 can subsequently be disconnected from the rectifier 204.

With the load disconnected, a quality check can then be performed by the processing device 306 according to an example of the present disclosure, by first initiating the collection of DC voltage data at the DC bus 206 of the variable frequency drive circuit 200. Initiating the collection of DC voltage data at the DC bus 206 preferably occurs while all of the IGBTs 224-234 are in an off state. The voltage at the DC bus is also preferably allowed to reach a steady state condition before the collection of DC voltage data at the DC bus is initiated. A next stage of the quality check can encompass turning on, and then rapidly turning off, a first IGBT and then a second IGBT of the pair of IGBTs in a given individual leg of the inverter 208. For example, the conductivity test may include rapidly turning on and then off, a first IGBT of the pair of IGBTs in a given phase leg, followed by rapidly turning on and then off, a second IGBT of the pair of IGBTs in the given phase leg. After turning on and off the IGBTs of the pair of IGBTs in the given individual leg of the inverter as described above, the conductivity test can further include terminating the collection of the DC voltage data at the DC bus 206. Preferably, the collection of the DC voltage data at the DC bus 206 is terminated when the DC bus voltage reaches zero volts.

Rapidly turning on and then turning off the first and second IGBTs by the processing device 306 results in a short period of time during which both of the IGBTs conduct electrical energy and during which an overlapping tail is created. A corresponding tail current is also generated during this time and can be used to discharge the DC bus capacitor 216. To help ensure the generation of a tail current, each of the first and second IGBTs disposed in a given phase leg may be turned on and then turned off with no dead time therebetween.

A further aspect of the processing device-driven quality check according to this example of evaluating the IGBTs of a three-phase inverter for proper functioning, includes generating a discharge profile of the DC bus capacitor 216 relative to each pair of IGBTs in the individual phase legs 218, 220, 222. The discharge profile of the DC bus capacitor 216 for a given phase leg 218, 220, 222 of the inverter 208 is a function of the current that passes through each IGBT of the pair of IGBTs 224 and 226, 228 and 230, or 232 and 234 in the given phase leg during the time that the each IGBT is turned on during the conductivity test. Therefore, the discharge profile of the DC bus capacitor 216 for a given phase leg 218, 220, 222 of the inverter 208 is also representative of the current conducting function of each IGBT in the given phase leg.

The above-described quality check operations can be repeated by the processing device for each individual phase leg 218, 220, 222 of the inverter 208 that includes a pair of IGBTs. In the case of the inverter 208, after performing a quality check on the IGBTs 224, 226 of the first phase leg 218, a quality check can also be performed relative to the IGBTs 228, 230 of the second phase leg 220, and the IGBTs 232, 234 of the third phase leg 222.

Subsequent thereto, the quality check may further include comparing the generated discharge profile associated with the IGBTs of each individual phase leg 218, 220, 222 with a stored reference discharge profile. The reference discharge profile can be a discharge profile resulting from discharging the DC bus capacitor 216 or a like DC bus capacitor using a reference IGBT, which may be an IGBT that has, as a result of testing or otherwise, been determined to be functioning properly. The reference discharge profile may be created offline, such as in a laboratory setting, and can be stored for access and use by the processing device 306. For example, the reference discharge profile may be stored in the memory 304 of the motor controller 300.

Figure 6:
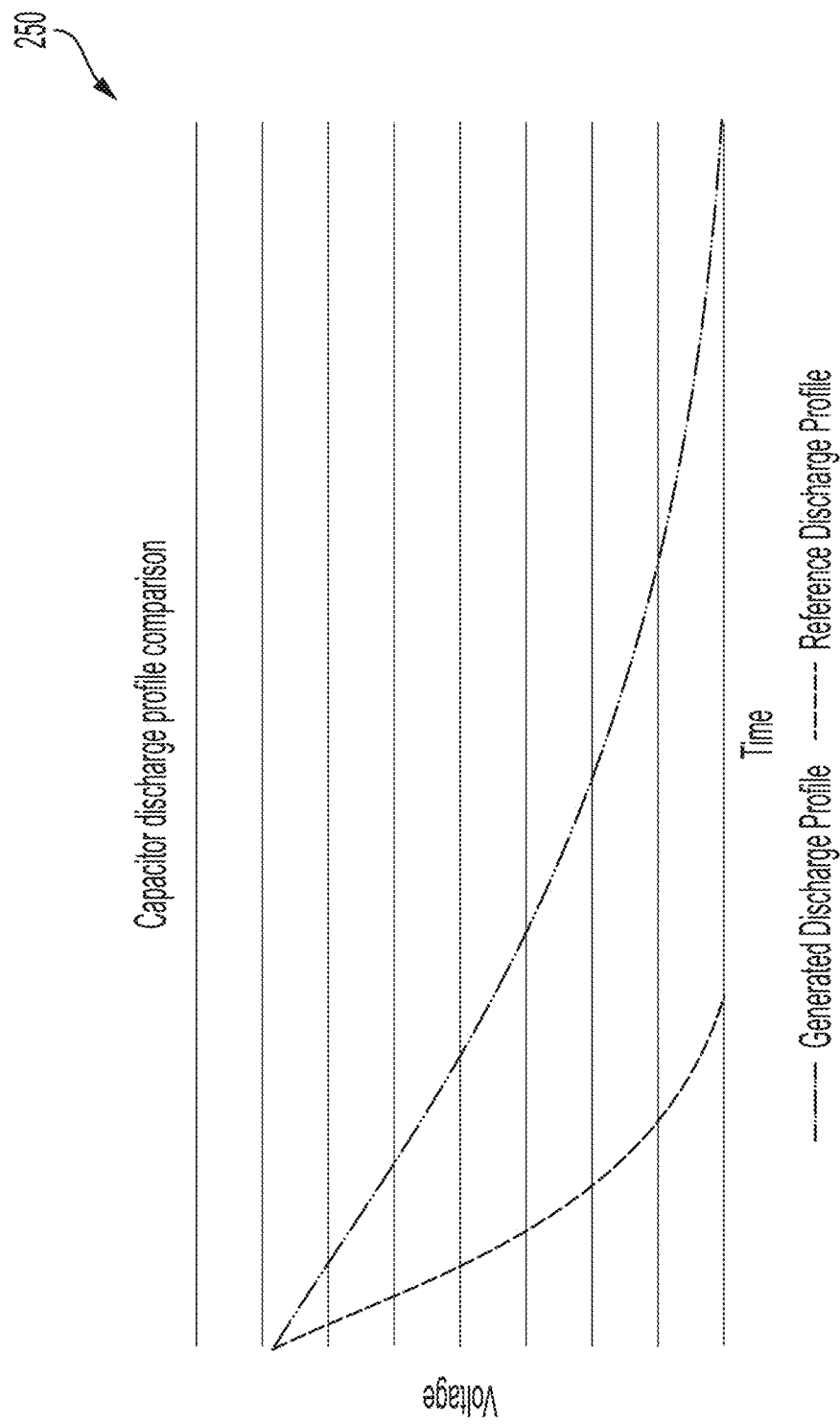
FIG. 6 is one example of a graphical comparison of capacitor discharge profiles that can be used to determine proper functioning of inverter IGBTs according to an aspect of the present disclosure.

Because the generated discharge profile of the DC bus capacitor 216 relative to a given phase leg 218, 220, 222 of the inverter 208 is a function of the current that passes through each IGBT of the pair of IGBTs 224 and 226, 228 and 230, or 232 and 234 in the given phase leg, the discharge profile generated relative to a phase leg having an improperly functioning IGBT will differ from the reference discharge profile. Such a case is graphically illustrated in the example of FIG. 6, where a generated discharge profile 250 associated with the IGBTs in a given inverter phase leg clearly differs from a reference discharge profile, because the phase leg associated with the generated discharge profile 250 includes an improperly functioning IGBT. As a result, the time required for a DC bus capacitor to be discharged by the tail current generated during conductivity testing of the subject IGBTs is longer than would be required if both subject IGBTs were functioning properly (as indicated by the reference discharge profile).

The quality check operation according to this example of evaluating the IGBTs of the variable frequency drive inverter 208 for proper functioning can, therefore, also include determining, based on comparing each of the generated discharge profiles with the reference discharge profile, that one or more of the plurality of IGBTs of the inverter 208 failed the quality check when the generated discharge profile for a given phase leg 218, 220, 222 differs from the stored reference discharge profile. In response to determining that one or more IGBTs of the inverter 208 failed the quality check, an IGBT evaluation example according to the present disclosure can also include generating by the processing device 306, a problem notification that at least indicates the failed quality check. Examples of such a problem notification can further include other information such as, for example, identification of an improperly functioning IGBT. In cases where no improperly functioning inverter IGBTs are found, examples according to the present disclosure can instead generate a notification or another indication that the variable frequency drive containing the inverter 208 is acceptable for use.

A threshold can be associated with the reference discharge profile in some examples of the present disclosure. More specifically, a generated discharge profile may be permitted to differ from the reference discharge profile within some threshold amount before the generated discharge profile is considered to be indicative of an improperly functioning IGBT. The threshold may be, for example, a zone around the reference discharge profile, a percentage difference between a generated discharge profile and the reference discharge profile, a degree difference in the slope of a generated discharge profile and the reference discharge profile, a difference in the time to full discharge of the DC bus capacitor, or some other value. Alternatively, in some examples, an experienced user may judge that a determined difference between a generated discharge profile and the reference discharge profile is sufficiently insignificant to allow continued use of an associated IGBT—at least for some period of time.

Figure 7:
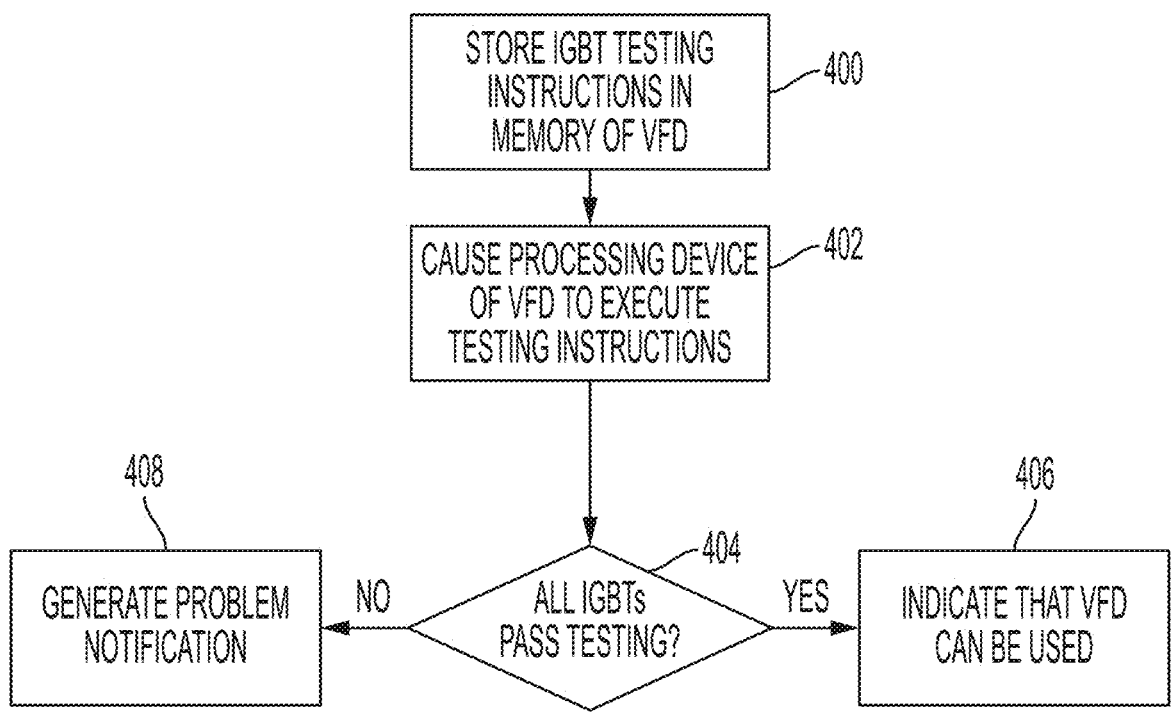
FIG. 7 is a simplified flowchart representing an example of a method of testing IGBTs of a variable frequency drive inverter to confirm proper functioning thereof according to an aspect of the present disclosure.

A simplified flowchart representing one example of a method for testing one or more of a plurality of IGBTs of a variable frequency drive inverter (VFD) to confirm proper functioning of the one or more of the plurality of IGBTs is presented in FIG. 7. According to the method example represented in the flowchart of FIG. 7, computer-executable instructions for testing the one or more of the plurality of IGBTs of the variable frequency drive inverter are initially stored in a memory of the variable frequency drive inverter, as represented at block 400. At block 402, a processing device of the variable frequency drive inverter can be caused, such as through an HMI in communication with the processing device and memory, to execute the instructions so as to test a function of the one or more of the plurality of IGBTs. At block 404, the processing device can evaluate the results of the testing. If the processing device confirms proper functioning of the one or more of the plurality of IGBTs, it can be indicated at block 406 that the variable frequency drive can be used. Alternatively, if the processing device determines that one or more of the plurality of IGBTs failed the testing, a problem notification can be generated as represented by block 408.

Figure 8:
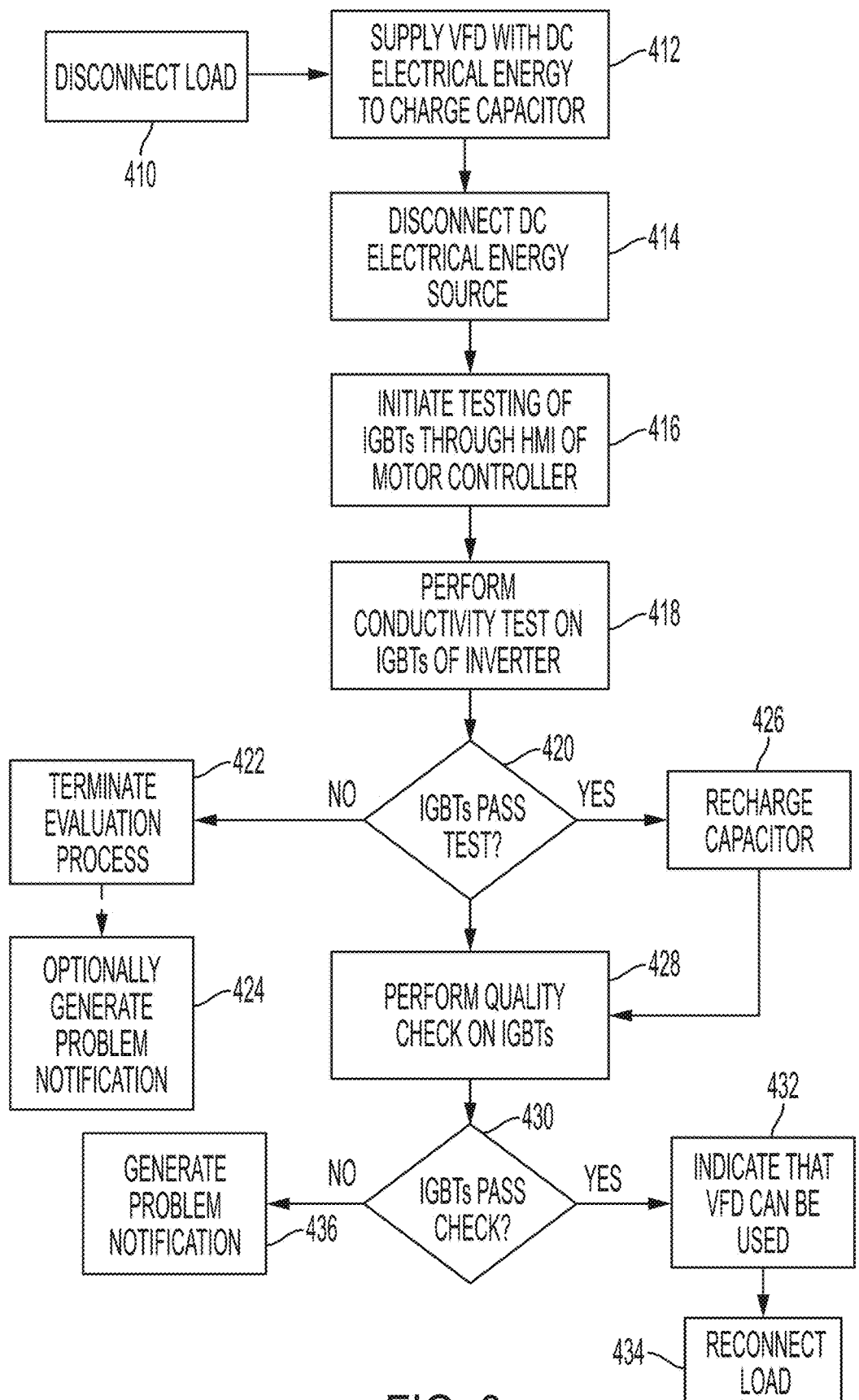
FIG. 8 is another flowchart representing an example of a method of testing IGBTs of a variable frequency drive inverter to confirm proper functioning thereof according to an aspect of the present disclosure.

For further illustration, FIG. 8 is a more detailed flowchart representing an example of a method for testing one or more of a plurality of IGBTs of a variable frequency drive inverter (VFD) to confirm proper functioning of the one or more of the plurality of IGBTs. In this example, the inverter is a three-phase inverter, and a pair of IGBTs is present in each of three individual phase legs of the three-phase inverter.

As indicated at block 410 of FIG. 8, the load (e.g., motor 210) is first disconnected from the variable frequency drive if the load is already connected at the time of testing. The inverter of the variable frequency drive can then be initially supplied with DC electrical energy to charge a DC bus capacitor of the variable frequency drive. As previously described, the DC electrical energy may be converted AC electrical energy supplied by an AC source to which the variable frequency drive is connected. As indicated at block 414, the source of DC electrical energy can then be disconnected from the inverter prior to initiating testing of the one or more of the plurality of IGBTs of the inverter.

As should be understood from previous description relative to the example of FIG. 3, computer-readable instructions written to cause a processing device of a motor controller of the variable frequency drive to test a function of the one or more of the plurality of IGBTs of the inverter to confirm proper functioning of the one or more of the plurality of IGBTs will have already been stored in a memory of the motor controller prior to initiating the IGBT testing process. Therefore, at block 416, the processing device of the variable frequency drive can be caused to execute the instructions to confirm proper functioning of the one or more of the plurality of IGBTs, such as through an HMI in communication with the variable frequency drive motor controller. As a result of initiating the testing process, the processing device is initially caused at block 418 to perform a conductivity test on the one or more of the plurality of IGBTs of the inverter. The conductivity test can be performed by the processing device by, for example, simultaneously turning on, in various preselected combinations, one of the IGBTs of the pair of IGBTs in each phase leg of the inverter.

Once the conductivity test is complete, the processing device can subsequently determine at block 420 whether the one or more of the plurality of IGBTs of the inverter passed the conductivity test. The one or more of the plurality of IGBTs of the inverter can be considered to have passed the conductivity test when, for example, voltages measure by the processing device across different combinations of the three phase legs of the inverter are as expected (e.g., VDC, −VDC, 0). If one or more of the plurality of IGBTs failed the conductivity test, then the evaluation process (testing operation) is preferably terminated at block 422. Optionally, a problem notification may also be generated to indicate a failed conductivity test, as indicated at block 424.

If the one or more of the plurality of IGBTs passed the conductivity test, the next stage of the testing process, which is performing a quality check on the one or more of the plurality of IGBTs, can be undertaken. As indicated at block 426, the DC bus capacitor is recharged prior to initiation of the quality check. As described in detail above, the quality check of the IGBTs may be performed by the processing device of the motor controller relative to each phase leg of the variable frequency drive inverter by collecting DC voltage data at the DC bus of the variable frequency drive circuit while turning on, and then rapidly turning off, a first IGBT and then a second IGBT of the pair of IGBTs in the given phase leg; terminating the collection of the DC voltage data at the DC bus; discharging a capacitor of the DC bus using a tail current generated by the turning on and off of the first and second IGBTs in the given phase leg; and generating a discharge profile of the DC bus capacitor that is indicative of the functioning of the IGBTs in the given phase leg.

The quality check can be performed in the manner described above, as represented at block 428. At block 430, the processing device can determine if the one or more of the plurality of IGBTs passed the quality check. For example, a discharge profile associated with each individual phase leg can be compared by the processing device with a stored reference discharge profile, and based on the comparison of the generated discharge profiles with the reference discharge profile, the processing device can determine that the one or more of the plurality of IGBTs of the inverter failed the quality check when the generated discharge profile for a given phase leg differs from the stored reference discharge profile.

If none of the plurality of IGBTs failed the quality check (i.e., if all the IGBTs of the inverter passed the quality check), the variable frequency drive can be deemed safe to use. In such a case, a notification or some other indication that the variable frequency drive is usable may be generated, as indicated at block 432. As represented at block 434, the load can then be reconnected to the inverter if desired.

Alternatively, and as indicated at block 436, in response to determining that the one or more of the plurality of IGBTs failed the quality check, the processing device can generate a problem notification or a similar warning that at least indicates the failed quality check. When such a problem notification is generated, the problem notification may also include other information, such as an identification of the inverter phase leg(s) where an improperly functioning IGBT(s) is located, or a more specific identification of an improperly functioning IGBT(s), such by way of a switch number or another IGBT identifier.

In some aspects, a variable frequency drive, a non-transitory computer-readable medium, and a computer-implemented method, are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a variable frequency drive, comprising: an inverter for controlling power to a load for a wellbore operation, the inverter including a plurality of insulated gate bipolar transistors (IGBTs); a processing device; and memory communicatively coupled to the processing device, the memory including instructions that are executable by the processing device for causing the processing device to test a function of one or more of the plurality of IGBTs to confirm proper functioning of the one or more of the plurality of IGBTs.

Example 2 is the variable frequency drive of example(s) 1, wherein the load is a motor coupled to a pump of an artificial lift device used in the wellbore operation.

Example 3 is the variable frequency drive of example(s) 1, wherein the memory includes instructions that are executable by the processing device for causing the processing device to: perform a conductivity test on the one or more of the plurality of IGBTs of the inverter; and determine that the one or more of the plurality of IGBTs of the inverter passed the conductivity test.

Example 4 is the variable frequency drive of example(s) 3, wherein: a pair of IGBTs of the plurality of IGBTs is disposed in each of at least two individual legs of the inverter; and the memory includes instructions that are executable by the processing device for causing the processing device to perform the conductivity test by simultaneously turning on, in various preselected combinations, one of the IGBTs of each of the pairs of IGBTs.

Example 5 is the variable frequency drive of example(s) 3, wherein the memory includes instructions that are executable by the processing device for causing the processing device to, subsequent to determining that the one or more of the plurality of IGBTs of the inverter passed the conductivity test, perform a quality check of the one or more of the plurality of IGBTs of the inverter.

Example 6 is the variable frequency drive of example(s) 5, wherein: a pair of IGBTs of the plurality of IGBTs is disposed in each of at least two individual legs of the inverter; and the memory includes instructions that are executable by the processing device for causing the processing device to perform the quality check for each individual leg of the inverter by: initiating collection of DC voltage data at a DC bus of the inverter; turning on, and then rapidly turning off, a first IGBT and then a second IGBT of the pair of IGBTs disposed in the individual leg of the inverter; terminating the collection of the DC voltage data at the DC bus; discharging a capacitor of the DC bus using a tail current generated by the turning on and turning off of the first and second IGBTs of the pair of IGBTs; generating a discharge profile of the DC bus capacitor; comparing the generated discharge profile with a stored reference discharge profile; and determining, based on comparing the generated discharge profile with the reference discharge profile, that one or both of the IGBTs of the pair of IGBTs failed the quality check when the generated discharge profile differs from the stored reference discharge profile.

Example 7 is the variable frequency drive of example(s) 1, wherein: the processing device and the memory are part of a motor controller of the variable frequency drive; and a human-machine interface is communicatively coupled to the motor controller, and is usable to write computer-readable instructions to the memory and to cause the processing device to test a function of the one or more of the plurality of IGBTs of the inverter.

Example 8 is a non-transitory computer-readable medium comprising instructions that are executable by a processing device for causing the processing device to perform operations comprising: testing a function of one or more of a plurality of insulated gate bipolar transistors (IGBTs) of an inverter of a variable frequency drive for controlling power to a load for a wellbore operation; and based on testing of the one or more of the plurality of IGBTs, confirming proper functioning of the one or more of the plurality of IGBTs.

Example 9 is the non-transitory computer-readable medium of example(s) 8, wherein the instructions are executable by the processing device for causing the processing device to: perform a conductivity test on the one or more of the plurality of IGBTs of the inverter; and determine that the one or more of the plurality of IGBTs of the inverter passed the conductivity test.

Example 10 is the non-transitory computer-readable medium of example(s) 9, wherein: a pair of IGBTs of the plurality of IGBTs is disposed in each of at least two individual legs of the inverter; and the instructions are executable by the processing device for causing the processing device to perform the conductivity test by simultaneously turning on, in various preselected combinations, one of the IGBTs of each of the pairs of IGBTs.

Example 11 is the non-transitory computer-readable medium of example(s) 9, wherein the instructions are executable by the processing device for causing the processing device to, subsequent to determining that the one or more of the plurality of IGBTs of the inverter passed the conductivity test, perform a quality check of the one or more of the plurality of IGBTs of the inverter.

Example 12 is the non-transitory computer-readable medium of example(s) 11, wherein: a pair of IGBTs of the plurality of IGBTs is disposed in each of at least two individual legs of the inverter; and the instructions are executable by the processing device for causing the processing device to perform the quality check for each individual leg of the inverter by: initiating collection of DC voltage data at a DC bus of the inverter; turning on, and then rapidly turning off, a first IGBT and then a second IGBT of the pair of IGBTs disposed in the individual leg of the inverter; terminating the collection of the DC voltage data at the DC bus; discharging a capacitor of the DC bus using a tail current generated by the turning on and turning off of the first and second IGBTs of the pair of IGBTs; generating a discharge profile of the DC bus capacitor; comparing the generated discharge profile with a stored reference discharge profile; and determining, based on comparing the generated discharge profile with the reference discharge profile, that one or both of the IGBTs of the pair of IGBTs failed the quality check when the generated discharge profile differs from the stored reference discharge profile.

Example 13 is the non-transitory computer-readable medium of example(s) 8, wherein: the processing device and the non-transitory computer-readable medium are part of a motor controller of the variable frequency drive; and a human-machine interface is communicatively coupled to the motor controller, and is usable to write computer-readable instructions to the non-transitory computer-readable medium and to cause the processing device to test a function of the one or more of the plurality of IGBTs of the inverter.

Example 14 is a computer-implemented method comprising: storing in a memory of a variable frequency drive for controlling power to a load for a wellbore operation, instructions that are executable by a processing device of the variable frequency drive to cause the processing device to test a function of one or more of a plurality of insulated gate bipolar transistors (IGBTs) of an inverter of the variable frequency drive; testing the one or more of the plurality of IGBTs by causing the processing device to execute the instructions; and based on the testing of the one or more of the plurality of IGBTs, confirming by the processing device, proper functioning of the one or more of the plurality of IGBTs.

Example 15 is the computer-implemented method of example(s) 14, wherein testing a function of the one or more of the plurality of IGBTs of the inverter of the variable frequency drive occurs at a site for the wellbore operation.

Example 16 is the computer-implemented method of example(s) 14, wherein testing a function of the one or more of the plurality of IGBTs of the inverter of the variable frequency drive comprises: performing, by the processing device, a conductivity test on the one or more of the plurality of IGBTs; determining, by the processing device, that the one or more of the plurality of IGBTs passed the conductivity test; subsequent to determining that the one or more of the plurality of IGBTs passed the conductivity test, performing by the processing device, a quality check of the one or more of the plurality of IGBTs; determining, by the processing device, that the one or more of the plurality of IGBTs failed the quality check; and in response to determining that the one or more of the plurality of IGBTs failed the quality check, generating by the processing device, a problem notification that at least indicates the failed quality check.

Example 17 is the computer-implemented method of example(s) 16, wherein the conductivity test and the quality check are performed with the load disconnected from the variable frequency drive.

Example 18 is the computer-implemented method of example(s) 16, wherein: a pair of IGBTs of the plurality of IGBTs is disposed in each of at least two individual legs of the inverter; and the conductivity test is performed by simultaneously turning on, in various preselected combinations, one of the IGBTs of each of the pairs of IGBTs.

Example 19 is the computer-implemented method of example(s) 16, wherein: a pair of IGBTs of the plurality of IGBTs is disposed in each of at least two individual legs of the inverter; and the quality check is performed on each individual leg of the inverter by: initiating collection of DC voltage data at a DC bus of the inverter; turning on, and then rapidly turning off, a first IGBT and then a second IGBT of the pair of IGBTs disposed in the individual leg of the inverter; terminating the collection of the DC voltage data at the DC bus; discharging a capacitor of the DC bus using a tail current generated by the turning on and turning off of the first and second IGBTs of the pair of IGBTs; generating a discharge profile of the DC bus capacitor; comparing the generated discharge profile with a stored reference discharge profile; and determining, based on comparing the generated discharge profile with the reference discharge profile, that one or both of the IGBTs of the pair of IGBTs failed the quality check when the generated discharge profile differs from the stored reference discharge profile.

Example 20 is the computer-implemented method of example(s) 19, wherein: initiating the collection of the DC voltage data at the DC bus occurs while all of the IGBTs are in an off state and with a voltage at the DC bus in a steady state condition; and the collection of the DC voltage data at the DC bus is terminated when the voltage at the DC bus reaches zero volts.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A variable frequency drive, comprising:
a drive control circuit including an inverter for controlling power to a load for a wellbore operation, the inverter including a plurality of insulated gate bipolar transistors (IGBTs);
a processing device; and
memory communicatively coupled to the processing device, the memory including instructions that are executable by the processing device for causing the processing device to test a function of one or more of the plurality of IGBTs using the drive control circuit by:
performing a conductivity test on the one or more of the plurality of IGBTs of the inverter, and
performing a quality check on the one or more of the plurality of IGBTs of the inverter by:
discharging a capacitor of a DC bus of the inverter using a tail current generated by turning on and turning off a first and a second IGBT of a pair of IGBTs of the plurality of IGBTs,
generating a discharge profile of the DC bus capacitor,
comparing the generated discharge profile with a stored reference discharge profile, and
based on a result of the conductivity test or comparing the generated discharge profile with the reference discharge profile, determining that one or more of the plurality of IGBTs is malfunctioning.

2. The variable frequency drive of claim 1, wherein the load is a motor coupled to a pump of an artificial lift device used in the wellbore operation.

3. The variable frequency drive of claim 1, wherein
performing the conductivity test on the one or more of the plurality of IGBTs of the inverter
includes determining that the one or more of the plurality of IGBTs of the inverter failed the conductivity test.

4. The variable frequency drive of claim 1, wherein:
a pair of IGBTs of the plurality of IGBTs is disposed in each of at least two individual legs of the inverter; and
the memory includes instructions that are executable by the processing device for causing the processing device to perform the conductivity test by simultaneously turning on, in various preselected combinations, one of the IGBTs of each of the pairs of IGBTs.

5. The variable frequency drive of claim 1, wherein the memory includes instructions that are executable by the processing device for causing the processing device to perform the quality check subsequent to determining that the one or more of the plurality of IGBTs of the inverter passed the conductivity test.

6. The variable frequency drive of claim 1, wherein:
a pair of IGBTs of the plurality of IGBTs is disposed in each of at least two individual legs of the inverter; and
the memory further includes instructions that are executable by the processing device for causing the processing device to perform the quality check for each individual leg of the inverter by:
 initiating collection of DC voltage data at the DC bus of the inverter;
 turning on, and then rapidly turning off, a first IGBT and then a second IGBT of the pair of IGBTs disposed in the individual leg of the inverter;
 wherein the tail current is generated by the turning on and turning off of the first and second IGBTs of the pair of IGBTs; and
 wherein performing the quality check includes determining that one or both of the IGBTs of the pair of IGBTs failed the quality check when the generated discharge profile differs from the stored reference discharge profile.

7. The variable frequency drive of claim 1, wherein:
the processing device and the memory are part of a motor controller of the variable frequency drive; and
a human-machine interface is communicatively coupled to the motor controller, and is usable to write computer-readable instructions to the memory and to cause the processing device to test the function of the one or more of the plurality of IGBTs of the inverter.

8. A non-transitory computer-readable medium comprising instructions that are executable by a processing device for causing the processing device to perform operations comprising:
in a variable frequency drive for controlling power to a load for a wellbore operation, testing a function of one or more of a plurality of insulated gate bipolar transistors (IGBTs) of an inverter of the variable frequency drive using a drive control circuit of the variable frequency drive that includes the inverter by:
 performing a conductivity test on the one or more of the plurality of IGBTs of the inverter, and
 performing a quality check on the one or more of the plurality of IGBTs by:
  discharging a capacitor of a DC bus of the inverter using a tail current generated by turning on and turning off of a first and a second IGBT of a pair of IGBTs of the plurality of IGBTs,
  generating a discharge profile of the DC bus capacitor,
  comparing the generated discharge profile with a stored reference discharge profile, and
  based on a result of the conductivity test or comparing the generated discharge profile with the reference discharge profile, determining that one or more of the plurality of IGBTs is malfunctioning.

9. The non-transitory computer-readable medium of claim 8, wherein
performing the conductivity test on the one or more of the plurality of IGBTs of the inverter
includes determining that the one or more of the plurality of IGBTs of the inverter failed the conductivity test.

10. The non-transitory computer-readable medium of claim 8, wherein:
a pair of IGBTs of the plurality of IGBTs is disposed in each of at least two individual legs of the inverter; and
the instructions are executable by the processing device for causing the processing device to perform the conductivity test by simultaneously turning on, in various preselected combinations, one of the IGBTs of each of the pairs of IGBTs.

11. The non-transitory computer-readable medium of claim 8,
wherein the instructions are executable by the processing device for causing the processing device to perform the conductivity check subsequent to determining that the one or more of the plurality of IGBTs of the inverter passed the conductivity test.

12. The non-transitory computer-readable medium of claim 8, wherein:
a pair of IGBTs of the plurality of IGBTs is disposed in each of at least two individual legs of the inverter; and
the instructions are further executable by the processing device for causing the processing device to perform the quality check for each individual leg of the inverter by:
 initiating collection of DC voltage data at the DC bus of the inverter;
 turning on, and then rapidly turning off, a first IGBT and then a second IGBT of the pair of IGBTs disposed in the individual leg of the inverter;
 wherein the tail current is generated by the turning on and turning off of the first and second IGBTs of the pair of IGBTs; and
 wherein performing the quality check includes determining that one or both of the IGBTs of the pair of IGBTs failed the quality check when the generated discharge profile differs from the stored reference discharge profile.

13. The non-transitory computer-readable medium of claim 8, wherein:
the processing device and the non-transitory computer-readable medium are part of a motor controller of the variable frequency drive; and
a human-machine interface is communicatively coupled to the motor controller, and is usable to write computer-readable instructions to the non-transitory computer-readable medium and to cause the processing device to test the function of the one or more of the plurality of IGBTs of the inverter.

14. A computer-implemented method comprising:
storing in a memory of a variable frequency drive for controlling power to a load for a wellbore operation, instructions that are executable by a processing device of the variable frequency drive to cause the processing device to test a function of one or more of a plurality of insulated gate bipolar transistors (IGBTs) of an inverter of a drive control circuit of the variable frequency drive;

testing the one or more of the plurality of IGBTs using the drive control circuit by causing the processing device to execute the instructions to:

perform a conductivity test on the one or more of the plurality of IGBTs of the inverter, perform a quality check on the one or more of the plurality of IGBTs by:

discharging a capacitor of a DC bus of the inverter using a tail current generated by turning on and turning off of a first and a second IGBT of a pair of IGBTs of the plurality of IGBTs, generating a discharge profile of the DC bus capacitor, comparing the generated discharge profile with a stored reference discharge profile, and based on a result of the conductivity test or comparing the generated discharge profile with the reference discharge profile, determining, by the processing device that one or more of the plurality of IGBTs is malfunctioning.

15. The computer-implemented method of claim 14, wherein testing the function of the one or more of the plurality of IGBTs of the inverter of the variable frequency drive is performed at a site for the wellbore operation.

16. The computer-implemented method of claim 14, wherein:

performing the conductivity test on the one or more of the plurality of IGBTs includes determining, by the processing device, that the one or more of the plurality of IGBTs passed the conductivity test;

the quality check is performed by the processing device subsequent to determining that the one or more of the plurality of IGBTs passed the conductivity test;

the quality check includes determining, by the processing device, that the one or more of the plurality of IGBTs failed the quality check; and in response to determining that the one or more of the plurality of IGBTs failed the quality check, the processing device generates a problem notification that at least indicates the failed quality check.

17. The computer-implemented method of claim 14, wherein the conductivity test and the quality check are performed with the load disconnected from the variable frequency drive.

18. The computer-implemented method of claim 14, wherein:

a pair of IGBTs of the plurality of IGBTs is disposed in each of at least two individual legs of the inverter; and the conductivity test is performed by simultaneously turning on, in various preselected combinations, one of the IGBTs of each of the pairs of IGBTs.

19. The computer-implemented method of claim 14, wherein:

a pair of IGBTs of the plurality of IGBTs is disposed in each of at least two individual legs of the inverter; and the quality check is performed on each individual leg of the inverter by:

initiating collection of DC voltage data at the DC bus of the inverter;

turning on, and then rapidly turning off, a first IGBT and then a second IGBT of the pair of IGBTs disposed in the individual leg of the inverter;

wherein the tail current is generated by the turning on and turning off of the first and second IGBTs of the pair of IGBTs; and wherein performing the quality check includes determining that one or both of the IGBTs of the pair of IGBTs failed the quality check when the generated discharge profile differs from the stored reference discharge profile.

20. The computer-implemented method of claim 19, wherein:

initiating the collection of the DC voltage data at the DC bus occurs while all of the IGBTs are in an off state and with a voltage at the DC bus in a steady state condition; and the collection of the DC voltage data at the DC bus is terminated when the voltage at the DC bus reaches zero volts.

* * * * *